US005483575A

United States Patent [19]
Zdanowski et al.

[11] Patent Number: 5,483,575
[45] Date of Patent: Jan. 9, 1996

[54] SYSTEM FOR CORRELATING RF USAGE IN A TRUNKED COMMUNICATION NETWORK BASED ON CHANNEL ASSIGNMENTS AND CHANNEL DROPS FOR EACH CALL

[75] Inventors: Thomas J. Zdanowski; George M. Autry, both of Lynchburg, Va.

[73] Assignee: Ericsson GE Mobile Communications Inc., Lynchburg, Va.

[21] Appl. No.: 20,075

[22] Filed: Feb. 19, 1993

[51] Int. Cl.[6] .................................................. H04Q 7/28
[52] U.S. Cl. ........................... 379/58; 379/91; 455/52.1; 340/825.03
[58] Field of Search .................... 340/825.34, 825.03; 370/583, 60, 67, 85.8; 375/40, 100; 379/56, 58, 91; 455/34.1, 38, 8, 52.1

[56] References Cited

U.S. PATENT DOCUMENTS

| | | | |
|---|---|---|---|
| 4,777,646 | 10/1988 | Harris | 379/91 |
| 4,860,341 | 8/1989 | D'Avello et al. | 379/91 |
| 4,977,589 | 12/1990 | Johnson et al. | 379/58 |
| 5,086,506 | 2/1992 | Hall et al. | 455/8 |
| 5,113,413 | 5/1992 | Brown et al. | 375/40 |
| 5,131,007 | 7/1992 | Brown et al. | 455/52.1 |
| 5,131,010 | 7/1992 | Derrenge et al. | 375/100 |
| 5,148,472 | 9/1992 | Freese et al. | |
| 5,185,797 | 2/1993 | Barrett et al. | 380/21 |
| 5,235,631 | 8/1993 | Grube et al. | 379/58 |
| 5,239,538 | 8/1993 | Teel, Jr. et al. | 370/58.3 |
| 5,241,537 | 8/1993 | Gulliford et al. | 370/67 |
| 5,313,652 | 5/1994 | Rozenstrauch et al. | 455/15 |
| 5,392,278 | 2/1995 | Teel et al. | 370/58.3 |
| 5,420,574 | 5/1995 | Erickson et al. | 340/825.03 |

FOREIGN PATENT DOCUMENTS

0499735A2 8/1992 European Pat. Off. .

OTHER PUBLICATIONS

"GE-MARC V•E Third Party Billing Package Development Manual,", LBI-30337, General Electric Company, May 1989.
"GE NET 900 System Manager User's Manual", LBI-38469, Ericsson GE Mobile Communications Inc. Jun. 1990.
Vachat, Gruner, Martinez–Amago, "Services Offered by Intelligent Network." Electrical Communication, vol. 63 #4, 1989.
Cellular One, "Personal Rate Plans", May 1991.
Subscriber Computing, Incorporated, "Company Profile" Jun. 24, 1991.
Southwestern Bell "Southwestern Bell Cellular Service System Description" pp. 13 and 14, 1985.
Nachrichtentechnik, Elektronik, vol. 41, No. 4, Jul. 1991, Berlin De, pp. 130–134, Wolfgang Kruger 'Bundelfunknetz Chekker', pp. 131–132.

*Primary Examiner*—Curtis Kuntz
*Assistant Examiner*—William Cumming
*Attorney, Agent, or Firm*—Nixon & Vanderhye

[57] ABSTRACT

A system and method are disclosed for correlating rf communications in a multi-site, trunked rf communication system which includes a plurality of site controllers for controlling radio unit rf communications in corresponding geographical site areas and at least one multi-site coordinator for monitoring messages from each site controller and establishing and removing rf communication channels. Information from the multi-site coordinator including channel assignments and channel drops generated for each communication originated from or received by each radio unit is obtained from the multi-site coordinator. RF communication resources used by each radio unit are then correlated and used to generate bills detailing for each radio unit specific instances and types of rf communication resources used.

26 Claims, 10 Drawing Sheets

SYSTEM FOR CORRELATING RF USAGE IN A TRUNKED COMMUNICATION NETWORK BASED ON CHANNEL ASSIGNMENTS AND CHANNEL DROPS FOR EACH CALL

FIELD OF THE INVENTION

The present invention relates to a system for correlating radio frequency (rf) usage to particular call communications. In particular, the present invention relates to a system for correlating rf resources to individual rf communications in a distributed, multi-site trunked communications system.

BACKGROUND AND SUMMARY OF THE INVENTION

There are known systems which provide billing and accounts receivable information for land-line telephone as well as cellular telephone communications. These systems are straightforward and can readily monitor the caller, callee, the time and date a call is made, and the duration of the call. At the end of each billing period, each telephone subscriber, whether based on the land-line or cellular telephone network, is provided with a bill, which includes among things an itemized list of calls made during the billing period and provides a total cost to the subscriber for the use of the telephone system and the particular communication resources.

There are also billing/accounts receivable products such as the GE-MARC V·E system manager which provide necessary software and database support (see e.g. in GE publication LBI-30337 ©May 1989) required to generate billing records for a single site controlled trunked rf communications system. An example of such a single site trunked communication system is disclosed in commonly assigned U.S. Pat. No. 4,905,302, entitled "Trunked Radio Repeater System" which is incorporated herein by reference. Although trunked communication systems provide much more efficient use of available bandwidth, they are considerably more complicated and therefore harder to monitor for billing purposes than land-based or cellular systems.

Trunked communication systems are even more complicated when multiple transmitting sites are established to provide rf communications to all geographic locations with a given locality. An example of such a multi-site trunked communications system is described, for example, in U.S. application Ser. No. 07/658,844, filed Feb. 22, 1991, entitled "Distributed Multi-Site Coordinator Architecture" (attorney docket 46-418), the disclosure of which is incorporated herein by reference. In these multi-site systems, prior billing systems such as the GE-MARC V·E system manager could only calculate rf usage on a per rf site basis. No capability is available to correlate individual calls and conversations to specific subscribers or a group of subscribers.

Accordingly, it is desirable that the present invention provide a billing correlation system which receives standard control messages from one (or more) multi-site coordinator(s) for all communications during a billing period for each of plural rf sites and correlates that message information into detailed records that include for each call communication at least the caller, callee(s), and rf air time used. Other desirable call specific information might also include call conversation elapsed time, conversation date and start time, rf sites involved in a call, and number of channel assignments.

The present invention relates to a method for correlating rf communications in a multi-site, trunked rf communication system including a plurality of sites ("site(s)" refers both to sites with and without site controllers) controlling mobile unit rf communications for corresponding site areas and at least one multi-site coordinator for monitoring site messages and establishing and removing rf communication channels. Information including channel assignments and channel drops generated for each communication originating from or received by each mobile unit is obtained from the multi-site coordinator. The rf communication resources used by each mobile unit are correlated for each communication based on the obtained channel assignment and channel drop information. Bills are then generated for each mobile unit detailing specific instances and types of rf communication resources used.

RF communication resources monitored for each communication include the date and time, the number of site areas involved, the call duration, the rate of service for the particular air time used, and the total cost. Specific types of rf communication resources may specify whether the communication was a voice or data communication, an encrypted or unencrypted communication, an individual or group communication, and whether it included a land-line telephone interconnect.

For communications involving a group of mobile units, bills may be correlated and provided to the group as well as to individual mobile units. The present invention correlates bills for calls generated by dispatch consoles to groups of mobile units in various site areas. Moreover, the present invention also provides specific bill correlation capabilities for mobile unit communications involving land-line telephone communications.

The method according to the present invention further includes generating call detail records for each communication based on the correlated channel assignment and channel drop information. The call detail records may then be converted into a format compatible with standard billing formats used in the telephone industry. Once converted, bills for each mobile unit can be readily generated using third party billing packages to detail the specific instances and types of rf communication resources used for a particular call.

A system according to the present invention includes plural rf sites for controlling trunked rf communications from and to mobile units within geographic site areas corresponding to the sites. A multi-site coordinator, in addition to establishing and removing rf communication channels for call communications involving mobile units in the plural site area, monitors control messages from all site regarding channel assignments and channel drops for each call communication. A correlation unit connected to the multi-site coordinator correlates rf communication resources used for individual and/or group call communications originating from or received by each mobile unit.

The correlation unit generates a call detail record for each call communication which indicates the specific rf communication resources used for each call communication. The system may further include a means for calculating and printing bills for each mobile unit and a means for converting call detail records into a format acceptable by the calculating means so that specific detailed items relating to rf usage for each mobile unit communication (e.g. the date, time, type, duration, number of sites, and total cost of each call in which the mobile unit was involved) can be included for each bill.

The multi-site coordinator includes a plurality of microprocessor-controlled nodes each corresponding to and coupled with the plurality of rf sites through a data link and a trunked audio link. An audio bus is connected to each node to convey the trunked communications between sites. A message bus is connected to each node to convey channel assignment and channel drop messages from each node. A central activity module (CAM) monitors messages on the message bus and collects in the form of raw data records those messages relating to rf channel usage. The correlation unit receives the raw data records from the central activity node over a high speed data link and converts the raw data records into individual call detail records for each call communication. A console interface node and a land-line interface node are also included for coupling call communications from a dispatch console and to/from a land line telephone network, respectively, to the multi-site coordinator.

BRIEF DESCRIPTION OF THE DRAWINGS

These and other features and advantages of the invention will be readily apparent to one of ordinary skill in the art from the following written description, read in conjunction with the drawings, in which.

DETAILED DESCRIPTION OF THE DRAWINGS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
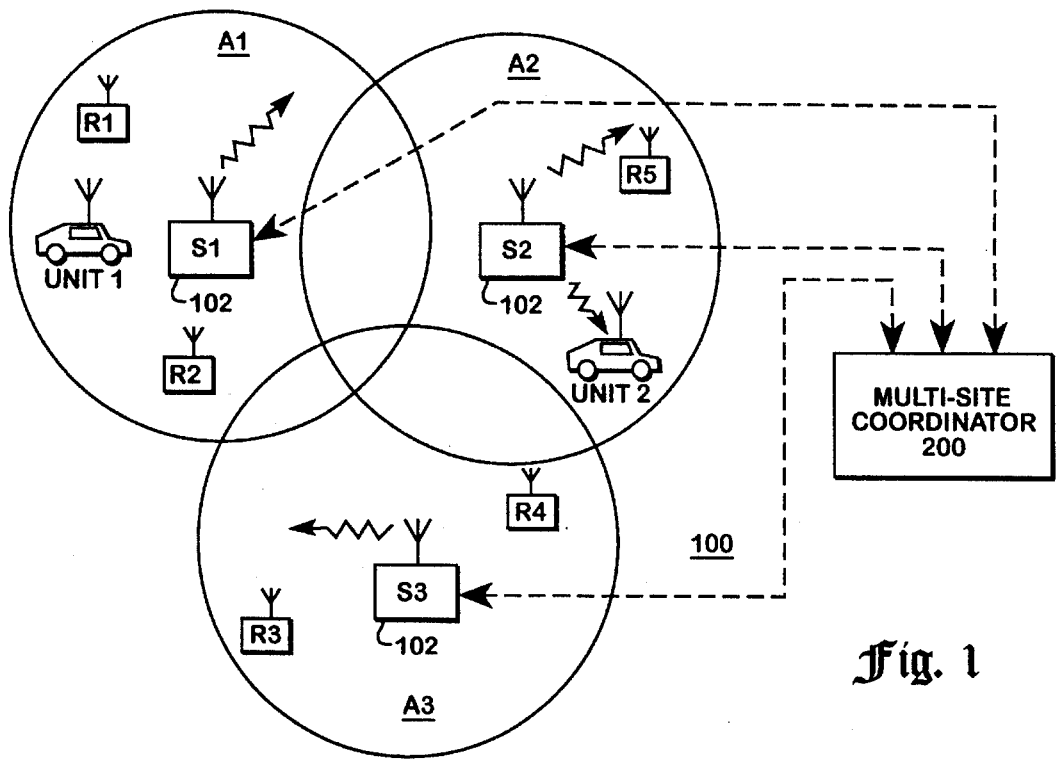
FIG. 1 is an illustration of an exemplary, three site, trunked radio system networked together by a multi-site coordinator controller.

To assist in understanding the present invention, an exemplary trunked rf communications system 100 in accordance with the invention is generally depicted in FIG. 1. For further details, however, reference is made to the U.S. patent application Ser. No. 07/658,844 described above. The system 100 includes several sites. Each site includes a site transceiver controller 102 that broadcasts signals over a certain geographical site area. For example, site S1 broadcasts over area A1. Individual mobile and/or portable radio units, (hereafter simply referred to as a mobile unit or radio unit), communicate with each other either directly via corresponding sites S1, S2 and S3 or via rf repeaters R1–R5 associated with each site. The mobile units can communicate with units within their own area or with units in other areas. The mobile units also communicate with a dispatcher console (not shown) with each site. Each site 102 controls data and audio traffic in its area as is described in more detail in U.S. Pat. No. 4,905,302 previously mentioned. Each site 102 communicates with the multi-site coordinator 200 which generally coordinates communications between sites 102.

Figure 2:
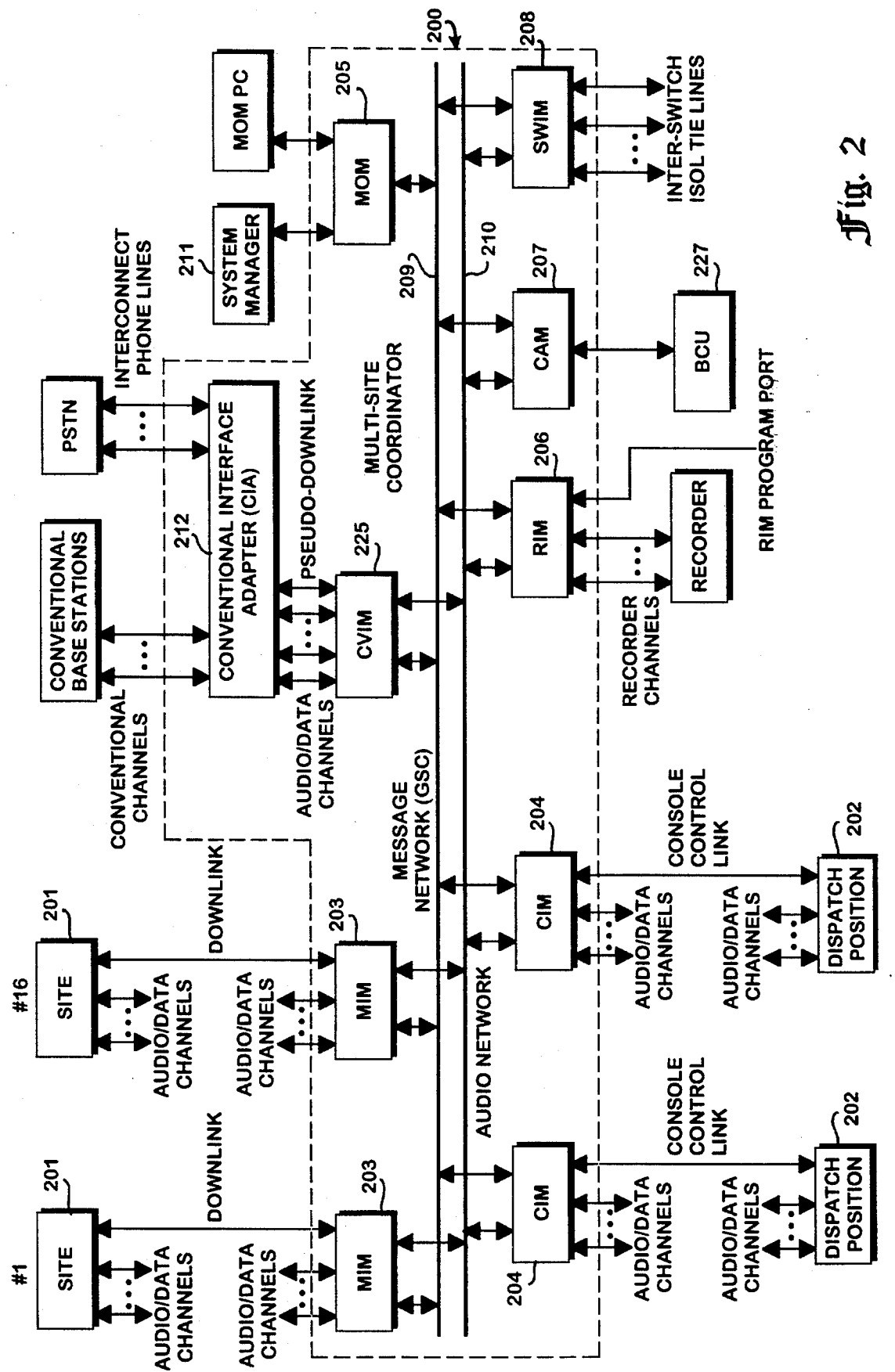
FIG. 2 is a schematic of an exemplary computer control architecture for a distributed multi-site network that may be used to implement the present invention.

Referring now to FIG. 2, a more detailed description of the multi-site coordinator 200 architecture and operation will be provided. Multi-site coordinator 200 coordinates communications between sites, dispatch consoles, and land-line telephone networks (e.g. PSTN). Both data and audio communication lines link the multi-site coordinator 200 and each site 201 and dispatch console 202.

The primary responsibility of the multi-site coordinator is to establish and remove audio and data channel connections among multiple rf channels allocated within a predetermined bandwidth. The multi-site coordinator comprises a local area network (LAN) of "nodes" labelled corresponding to whether they interface with a site, dispatcher console or other system component. For example, Master Interface Modules (MIMs) 203 are nodes in the multi-site coordinator 200 that interface with sites 201, and Console Interface Modules (CIMs) 204 are nodes that interface with dispatcher consoles 202. Other nodes include a Monitor Module (MOM) 205, a Recorder Interface Module (RIM) 206, Conventional Interface Module (CVIM) 225, Switch Interconnect Module (SWIM) 208, and a Central Activity Module (CAM) 207 connected to Billing Correlation Unit (BCU) 227 which is described in further detail below.

The MOM 205 is the interface for a system manager 211 and a MOM PC (personal computer). The system manager 211 updates the databases maintained in all of the nodes. The MOM 205 maintains certain centralized databases including databases for smart calls and confirmed calls. Smart calls relate to the operation of the dispatcher console. A call is "smart" if the call has been selected, i.e., being listened to by the dispatcher. A confirmed call is one for which the audio channel slot assignments must be confirmed before the caller begins talking. The system manager 211 sets which calls are to be confirmed and provides this information to the sites 201. The channel assignment for the originating call from a "primary" site instructs the multi-site coordinator 200 that the call is to be confirmed. The MOM 205 receives a message that a confirmed call is requested and then tells the primary MIM 203 which secondary MIMs 203 must confirm the call by sending a "site mask" to the primary MIM. The site mask identifies each secondary MIM to participate in the confirmed call.

The RIM 206 interfaces recorders to the switch 200 which are assigned to record calls for various groups or units. The CVIM 225 functions much the same as a MIM 203 but is indirectly coupled to standard PSTN or PBX land-based telephone lines and base stations, whereas the MIMs 203 are coupled to sites 201 for trunked radio communications. The conventional interface adapter (CIA) 212 is merely an interface between the CVIM 212 and the telephone lines and base stations. Similarly, the SWIM 208 interfaces the switch 200 with PSTN telephone lines.

Each of the above-described nodes in the multi-site coordinator is supported by a microprocessor-controlled communications card. All of the cards for the MIMs, CIMs, CVIM, MOM, RIM and SWIM have the same hardware and are interchangeable. The cards have different "personalities" to indicate that they are assigned to, for example, a site 201 or a dispatcher console (dispatch position) 202. Each card can be easily configured to be a MIM, CIM, etc., by setting a few switches on the card.

All nodes of the multi-site coordinator 200 are connected to a digital message bus network 209 and a digital audio bus 210. The message bus 209 may be a message network using an Intel 80C152 Global Serial Channel (GSC) microprocessor where the message network is a high speed data bus that resides in the GSC microprocessor. The audio bus network 210 includes, for example, 32 time division multiplexed buses. Each bus contains 32 slots that each carry a single audio channel. A maximum of 1024 audio slots may be routed through the multi-site coordinator (32 buses×32 slots). The audio channel slots are assigned by the MOM to specific nodes, e.g., MIMs and CIMs, when the multi-site coordinator 200 is enabled and initialized.

As part of the initialization procedure, the nodes connect their assigned bus/slots to their external channel inputs. For example, a MIM 203 will couple each channel from the corresponding site 201 to a separate audio bus/slot. Once the bus/slot is linked to the channel, the bus/slot receives the output from the channel through the host node. Of course, the channel has no intelligible signal until it is assigned to a call by the site. Although a bus/slot is linked to a site channel for purposes of transmission, no other node is listening to that bus/slot until the host node sends a slot assignment message throughout the switch notifying the other nodes that a call has been assigned to that bus/slot.

Figure 3:
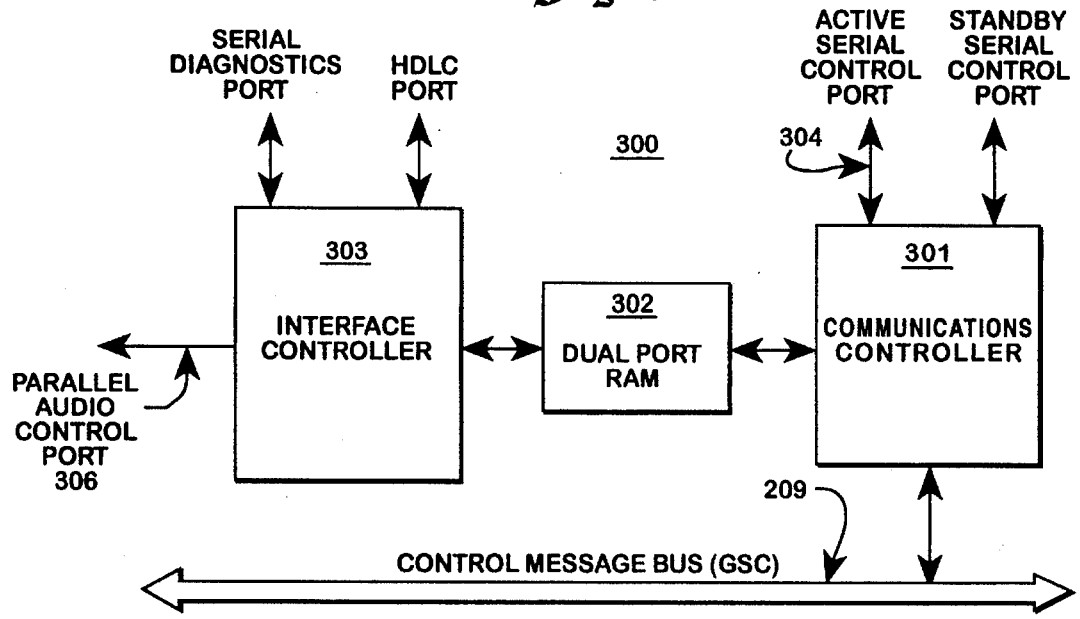
FIG. 3 is a block diagram of an exemplary microprocessor-controlled node architecture that may be used to implement the present invention.

FIG. 3 shows a block diagram of one of the node interface module cards 300. This diagram is applicable to all of the nodes of the multi-site coordinator except for the conventional interface adapter (CIA). Thus, the hardware for the MIM, CVIM, MOM, SMIM, RIM, CIM, and CAM is essentially a switch controller card. Each card includes a communications controller 301, a dual port random-access-memory (RAM) chip (302), and an interface processor 303.

The communications controller 301 is a message router. It routes messages between the control message bus (GSC) 209 and (1) the serial port 304 leading to a corresponding site 201 and (2) the interface processor 303 through the dual port RAM 302. The communications controller 301 may be an Intel 80C152 microprocessor. The communications controller 301 places messages onto and receives messages from the message bus 209. Messages received from the site 201 over the serial port 304 are translated into a format usable by the multi-site coordinator 200. The communications controller 201 also translates multi-site coordinator messages into a format that the site 201 understands.

The interface processor 303 performs substantially all of the logical functions for the interface module 300. The interface processor may be for example an Intel 80C186 microprocessor and acts as a switch for the audio network and assigns slots to active audio channels through the parallel audio control port 306.

Each call through the multi-site coordinator is assigned to a channel slot on the audio bus. When the call is terminated, the slot is "dropped" and made available for assignment to another call. The interface processor 303 for each MIM 203 assigns slots, connects audio slots to the site or dispatcher console to establish a communications link, and terminates calls. Since all MIMs and CIMs perform these functions, they must continually inform each other (and the other nodes) of their current slot assignments. Accordingly, the MIMs and CIMs send messages regarding channel slot assignments, channel slot updates and channel slot drops over the message network 209 to other nodes, including the CAM 207.

The communications controller 301 for each node initially processes all of the messages on the message network. Channel slot assignments are forwarded to the interface processor 303 through the dual port RAM 302. Messages regarding slot updates or dropped channel slots are processed by the communications controller 301 by referring to a bit map located in the RAM storage 302. Update messages are sent periodically by a primary MIM to confirm to the other nodes the active status of a slot. When a primary MIM (corresponding to origin of call) terminates the call, it sends a channel slot drop message to the other nodes. The primary MIM also periodically sends update idle messages until the channel slot is reassigned to another call.

The channel slot bit map stored in the dual-port-RAM 302 identifies the status of each audio channel slot on all 32 buses. The bit map is updated by slot assignment messages, slot idle messages and slot updates that are sent on the message bus 209. Slot assignment messages inform all nodes of the bus and slot number hosting the call. A more complete disclosure of the slot bit map and slot status messages is contained in application Ser. No. 07/658,640 entitled "Bus Slot Update/Idle Control In rf Trunking multi-site Coordinator" filed on Feb. 22, 1991, now U.S. Pat. No. 5,253,253.

The MIM 203 is coupled to the site 201 through a standard serial land line (e.g. a telephone line). The MIM receives digital command signals from the site through a down link line such as is described in commonly assigned U.S. Pat. No. 4,835,731, entitled "Processor-To-Processor Communications Protocol For A Public Service Trunking System" and is incorporated by reference.

Each MIM 203 maintains databases that identify the mobile units and groups of mobile units within its corresponding site that correspond to active calls. These databases are set up by the system manager 211 and sent to all of the nodes. The unit database identifies each mobile unit in the wide area system. For each MIM, some of the units will be in its assigned site area and others will be outside of its area. The MIM keeps track of which units are in its area. Each mobile unit may participate as a member of several different groups, and the mobile unit operator selects the desired group at any particular time. A group is a collection of mobile units that communicate together on a single call. For example, there may be a group for the fire department that allows all of the fire trucks to listen to the central dispatcher or the fire chief. The dispatcher dials this group into his console to broadcast messages to all fire trucks. Similarly, groups can be established of rescue stations, police units assigned to a particular precinct, and many other combinations of users of the public service radio system.

Each site broadcast a control channel throughout the area covered by its corresponding site. Every mobile unit in that area is locked onto this control channel. When a mobile unit leaves the area and loses reception of that control channel, the mobile unit scans for another control channel until it locks on to the control channel being broadcast in the area into which the mobile unit has moved. After locking onto this new control channel, the mobile unit transmits a log in signal to the corresponding site which then sends that log in signal to corresponding MIM. The log in identifies the mobile unit and its currently selected group.

There are several commands used by the multi-site coordinator for activating a call from a remote mobile unit and from a dispatcher console, for confirming receipt of the call request, and for terminating the call. The MIM communicates with the sites using the message format and protocol of the site. U.S. Pat. No. 4,835,731 sets forth many such commands for a public service trunking system.

In operation, a primary MIM receives a radio originated channel assignment from its corresponding site 201. This signal indicates that a mobile unit in the area assigned to the MIM wants to call another unit, group, or land-line telephone number, and its site has already assigned a channel to the call for its area. All channel assignments are sent to the multi-site coordinator 200. Since the MIM assigned to the caller is the primary MIM, all MIMs assigned to callees are secondary MIMs.

The primary MIM responds to the radio originated channel assignment by sending a channel slot assignment message identifying the slot on the audio bus assigned to the call over the message bus 209. Upon receipt of the slot assignment message, each CIM 204 looks through its database to determine if the callee is programmed at a dispatch console 202. If the callee is programmed, the CIM informs its corresponding dispatcher console of the call and connects the audio slot for the call to the dispatcher console 202. In this way, the dispatcher console 202 monitors all calls that involve groups or mobile units that have been programmed by the dispatcher.

The secondary MIMs receive a slot assignment and a slot update from the primary MIM. Each secondary MIM checks its database to determine whether the callee is listed as being in its area. If the callee is not in its area, then the node does nothing. If there is a callee in its area, the secondary MIM is designated as a secondary site. The secondary MIM sets the assigned channel slot bit (or clears the bit if the slot assignment says the channel is dropped or unkeyed) on its bit map maintained in RAM 302 to stop subsequent updates from being sent to the interface processor 303 on the card. The secondary MIM then generates and transmits a secondary originated channel request to its corresponding site 201. When the site 201 responds with a secondary originated channel assignment from the site, the secondary MIM confirms that the secondary channel assignment corresponds to an active pending call. At this point, the call communication is confirmed and commences.

When the caller terminates a call by unkeying the push-to-talk (PTT) button in his mobile unit, the site 201 transmits an unkey or drop signal to the primary MIM 203. A drop signal terminates a call and causes the assigned audio slot to be idled. The primary MIM updates its site channel database to verify the call termination. The primary MIM also sends an idle slot assignment message to the other nodes of the multi-site coordinator informing them that the channel has been dropped. Secondary MIMs generate and transmit a secondary originated unkey signal to their corresponding sites and remove the call from the list of active site channels. In addition, a callee mobile unit can release itself from a call simply by sending a secondary originated unkey/drop signal to its site. The secondary site transmits an unkey/drop signal to its corresponding secondary MIM to disengage the secondary site from the audio slot assigned by the primary MIM.

Figure 4:
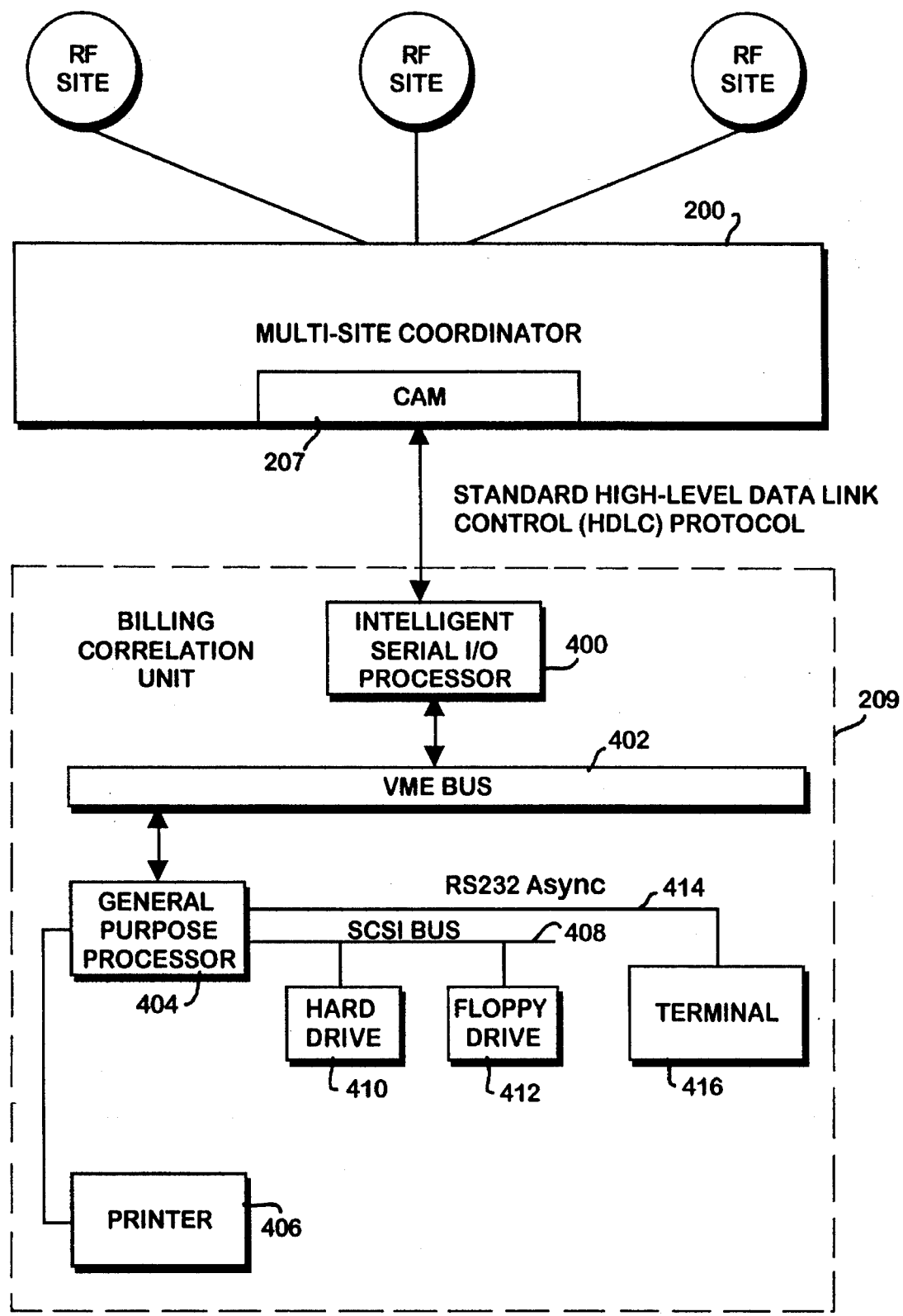
FIG. 4 is a simplified function block diagram of the present invention in conjunction with the exemplary rf trunked multi-site communication system shown in FIGS. 1–3.

Having briefly described an exemplary rf trunked communications system, the billing correlation aspects of the present invention are now described. FIG. 4 shows a simplified function block diagram of the present invention in conjunction with the above-described rf trunked multi-site communication system. A billing correlation unit 209 receives from CAM 207 channel assignments and channel drops for each rf site over a conventional High Level Data Link Control (HDLC) network. This information can be transmitted using standard HDLC protocol at any sufficiently high data rate (e.g., 307K bits/sec).

The channel slot assignment and channel slot drop information from the CAM 207 is received and initially processed by intelligent serial I/O processor 400. I/O processor 400 may be a conventional processor such as microVAX 3100™ available from Digital Equipment Corporation.

The basic functions of the I/O processor 400 (described in further detail below) generally include gathering site channel assignments and site channel drops in the form of raw input records and producing call detail records (CDR) that include among other things caller, callee, call type, rf air time used, conversation elapsed time, conversation start time, rf sites involved, a channel use map, and the number of push-to-talk activations involved in each call communication. Various different call types can be handled in the billing correlation unit 209 including clear voice, encrypted voice, and land-line telephone interconnects.

CDRs generated for each communication are transferred over a VME bus 402 to a general purpose processor 404 which can then store the CDRs in database type format on hard drive 410 and floppy drive 412 connected via conventional SCSI bus 408. An operator can communicate to general purpose processor 404 and generate billing printouts from a printer 406 based on commands input to terminal 416 connected to processor 404 via RS232 asynchronous link 414.

Figure 5:
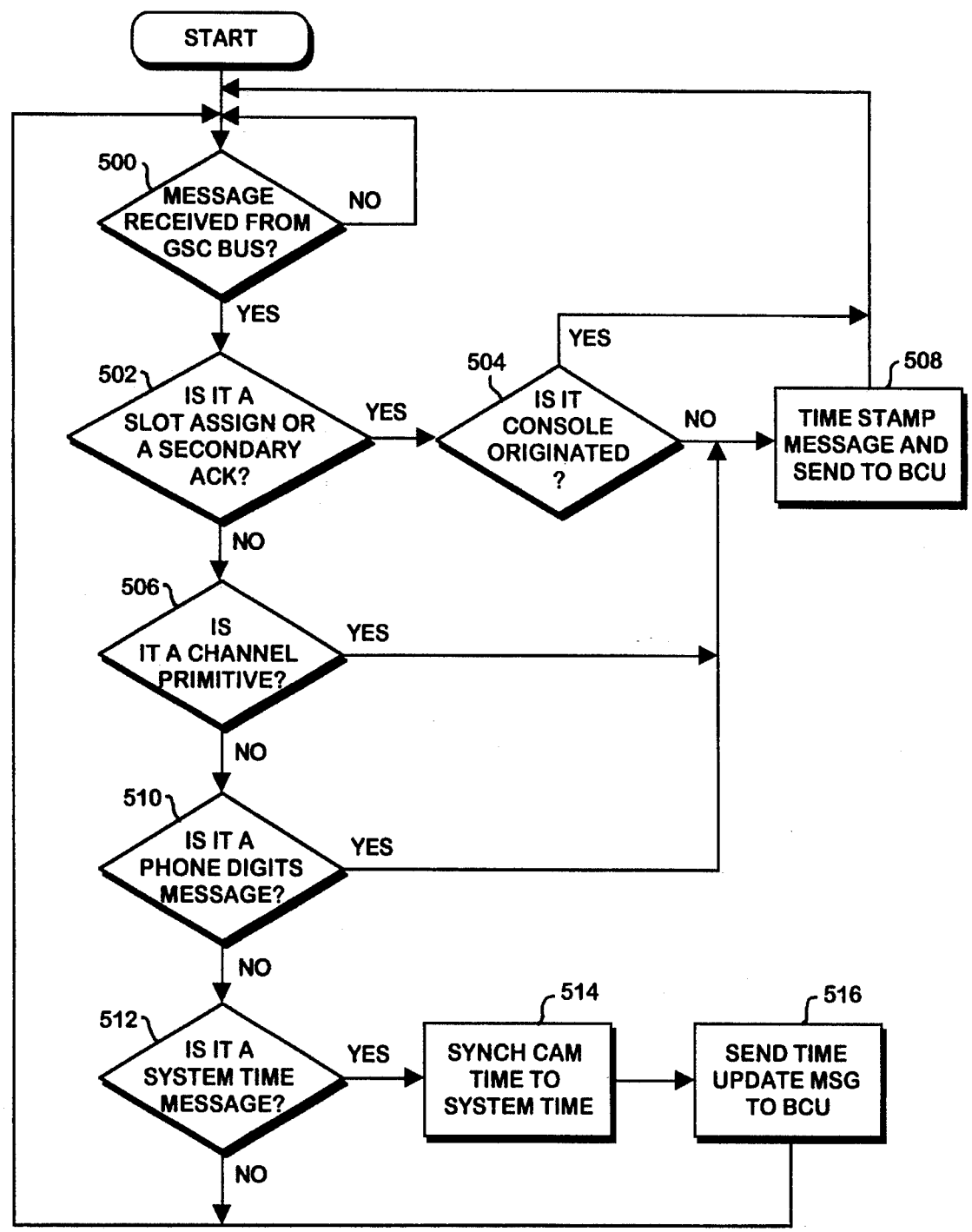
FIG. 5 is an exemplary flow chart describing the operation of the central activity module node of the multi-site coordinator for implementing the present invention.

Referring now to FIG. 5, the CAM processing module 207 in the multi-site coordinator 200 processes messages received over the GSC message bus 209 (block 500). Once a message is received, it is analyzed to determine whether the message is a channel slot assignment (primary or secondary) or a secondary acknowledgement of a channel assignment (block 502). If so, it is determined whether the message originated from a dispatch console 202 in decision block 504. It if did, control is returned to decision block 500. If not, the channel assignment/confirm message is time stamped and sent to the billing correlation unit 209 (block 508). If the message is not a slot assignment or a secondary acknowledgment, a determination is made in decision block 506 whether the message is a channel primitive. A channel primitive is simply a label used to define a message transmitted from each MIM involved in a console originated call to indicate to the originating dispatch console that a channel has been assigned or dropped. If the message is a channel primitive, it is time stamped and sent to the BCU in (block 508). Otherwise, control proceeds to decision block 510 to determine whether the message is a phone digits message. A phone digits message is transmitted from the primary MIM during a radio-to-land line call (e.g. PSTN) and contains the phone digit sequence (i.e. telephone number) of the land-based callee. If so, this phone digits message is time stamped and sent to the BCU in block 508. If not, control proceeds to decision block 512 wherein it is determined if the message is a system time message. If it is, the CAM 207 internal timing is synchronized to the system time received in the message (block 514), and a time update message is transmitted to the BCU 227 in block 516.

The I/O processor 400 performs a plurality of subroutines in order to generate the necessary CDRs for each call based on the information received from CAM 207 described above. The essential process steps used to implement each of these subroutines is now described in conjunction with FIGS. 6–13.

Figure 6:
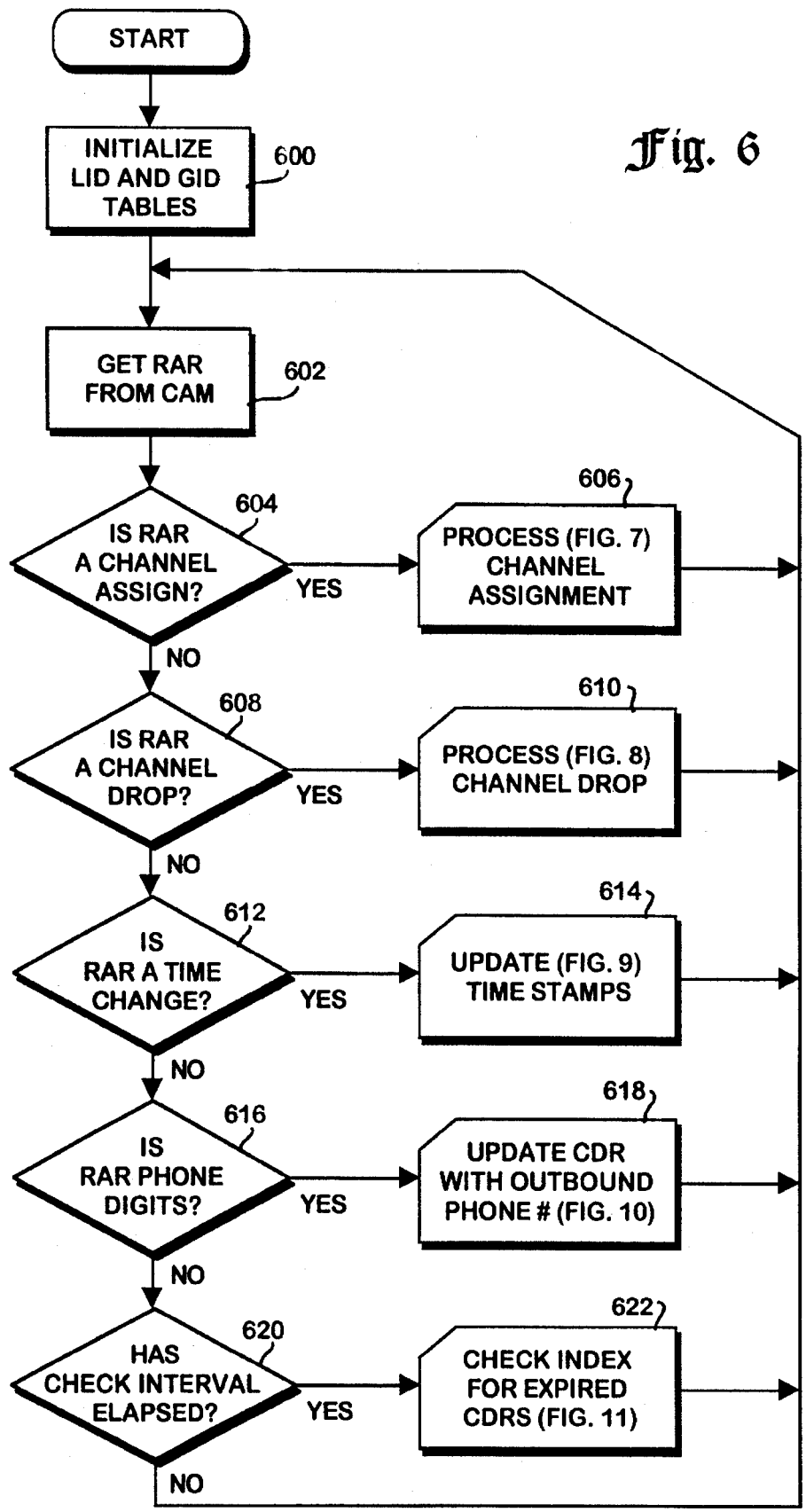
FIGS. 6–12 are exemplary flow charts illustrating the procedures followed by the billing correlation unit for implementing the present invention.

FIG. 6 illustrates a subroutine for compiling air time used for each subscriber in the system. An initialization takes place in block 600 where a logical identification (LID) table and group identification (GID) table are generated so that each subscriber and each group has a unique identification number used in generating call data records. Control proceeds to block 602 where raw activity records (RAR) are obtained from the CAM 207 which includes recent channel slot assignments, channel slot drops, channel primitives, and telephone digits for calls involving a land-based telephone network. A decision is made in block 604 if the raw activity record (RAR) is a channel assignment. If it is, the channel assignment is processed in block 606 to correlate that assignment with a corresponding CDR as described in more detail in FIG. 7. Otherwise, control proceeds to decision block 608 which determines if the raw activity record is a channel drop. If it is, the channel drop is processed to correlate that drop with the corresponding CDR in block 610 as described in more detail in FIG. 8; otherwise control proceeds to decision block 612 where a decision is made if the raw activity record is a time change. If it is, the time change is processed according to FIG. 9. Otherwise, control proceeds to decision block 616 to determine if the raw activity record is a telephone digits record. If so, the appropriate CDR is updated with the outbound telephone number in block 618 as described in detail in FIG. 10. Otherwise, control proceeds to decision block 620 which determines whether a check interval has elapsed as described in detail in FIG. 11. If it has, the BCU database is checked for expired CDRs. When a call conversation ends or a sufficiently long "hang time" has elapsed, the call is determined to have ended. No further information will be stored in the CDR corresponding to that call, and therefore, that CDR is said to have "expired".

Figure 7:
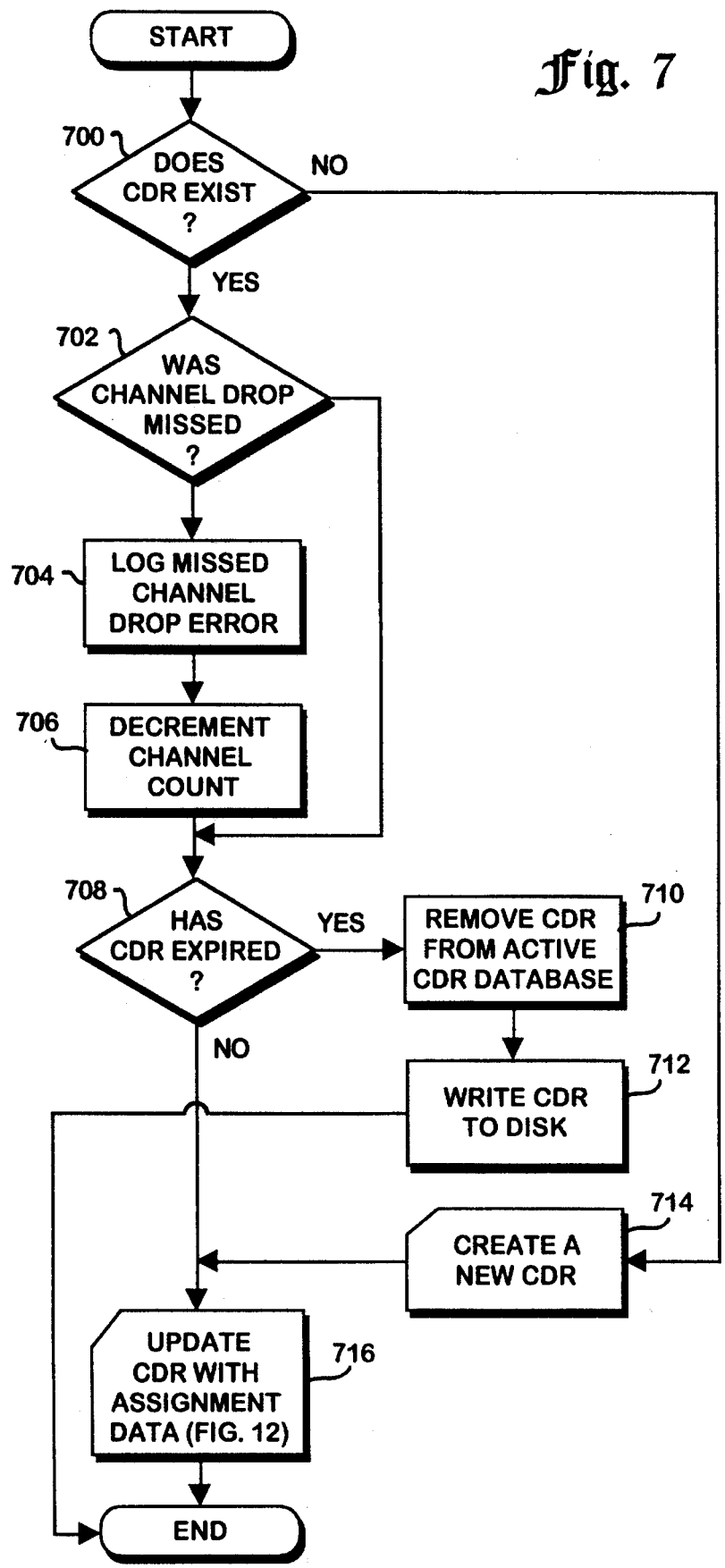

FIG. 7 describes a subroutine for processing channel assignments contained in RARs performed in block 606. Decision block 700 determines whether a CDR exists for a channel assignment contained in the received RAR. If not, control proceeds to block 714 to create a new CDR corresponding to the newly initiated and assigned call. If a CDR does exist, control proceeds to decision block 702 to determine whether a channel drop message for the channel assigned was missed. A missed channel drop is detected when two consecutive identical channel assignments are received for the same caller. Obviously, the first call must have ended before the second channel assignment could occur. Since the number of channel assignments per call is monitored using a channel counter, the channel count is decremented in block 706 to correct for the missed channel drop. Otherwise, the missed channel drop is logged as a missed channel drop error in block 704. A decision is made whether the CDR corresponding to the received RAR has expired in block 708. If it has, the CDR is removed from an active CDR database stored in the processor working RAM and written into disk memory 410, 412 in blocks 710 and 712 after which control ends. For new and unexpired CDRs, control proceeds to block 716 where the CDR is updated with channel assignment data from the corresponding RAR.

Figure 8:
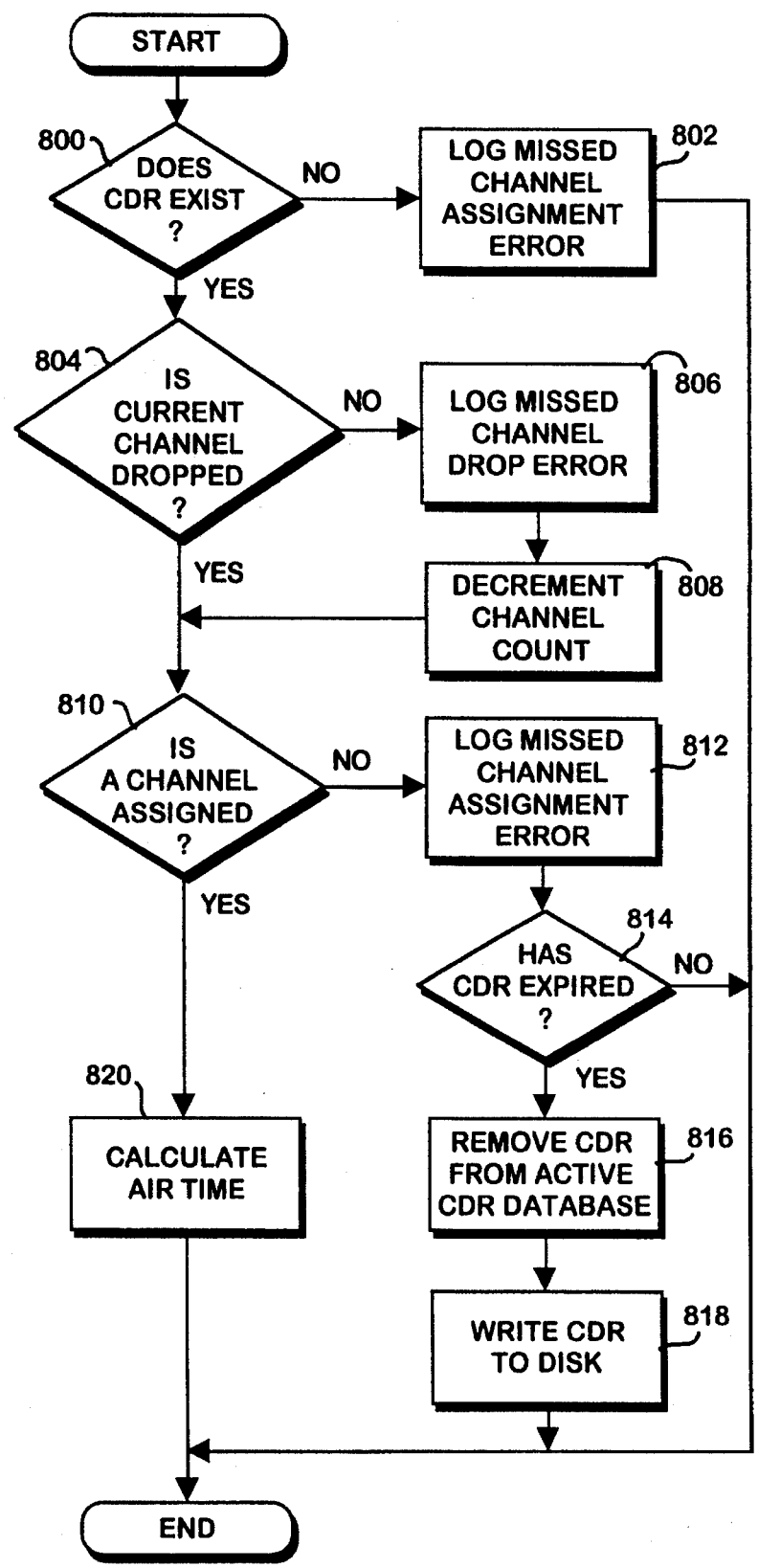

A subroutine for processing channel drop messages performed in block 610 is described now in conjunction with FIG. 8. A decision is made in block 800 whether a CDR exists for the channel drop contained in the received RAR. If not, a missed channel assignment error is logged in block 802 and processing ends. Like a missed channel drop described above, a missed channel assignment is detected when two consecutive channel drops are received for the same channel without an intervening channel assignment. Otherwise, control proceeds to block 804 where a decision is made whether the channel in the RAR drop message corresponding to the preceding channel assignment for the CDR correlated to that RAR has been dropped. If not, a missed channel drop error is logged in block 806, and the channel count is decremented in block 808. If that channel is dropped, a decision is made in block 810 whether the dropped channel was previously assigned. If not, a channel assignment error is logged in block 812, and a decision is made in block 814 whether the CDR has expired. If it has expired, it is removed from the active CDR database in block 816 and written to the disk storage 410, 412 in block 818. If a channel was previously assigned and is just dropped, this fact and time are noted and a total air time is calculated and stored in the CDR in block 820 according to the following: Air Time=(time channel assigned-time channel dropped).

Figure 9:
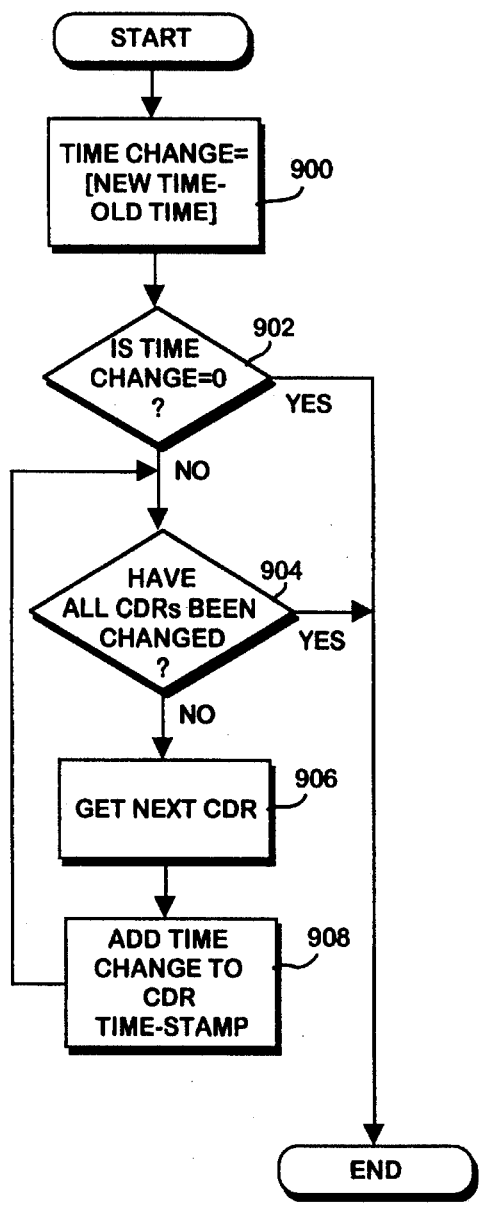

A subroutine for updating the time stamps operation performed in block 614 is described now in conjunction with FIG. 9. Any time change is determined in block 900 according to the algorithm: time change=[new time–old time]. A decision is made in block 902 whether the time change equals 0. If so, there is no time change and processing in this subroutine ends. If there is time change, a decision is made in block 904 to determine if all CDRs have been corrected to reflect this time change. If so, processing of this subroutine ends. If not, the next CDR is obtained in block 906 and the time change algebraically added to that CDR time stamp in block 908.

Figure 10:
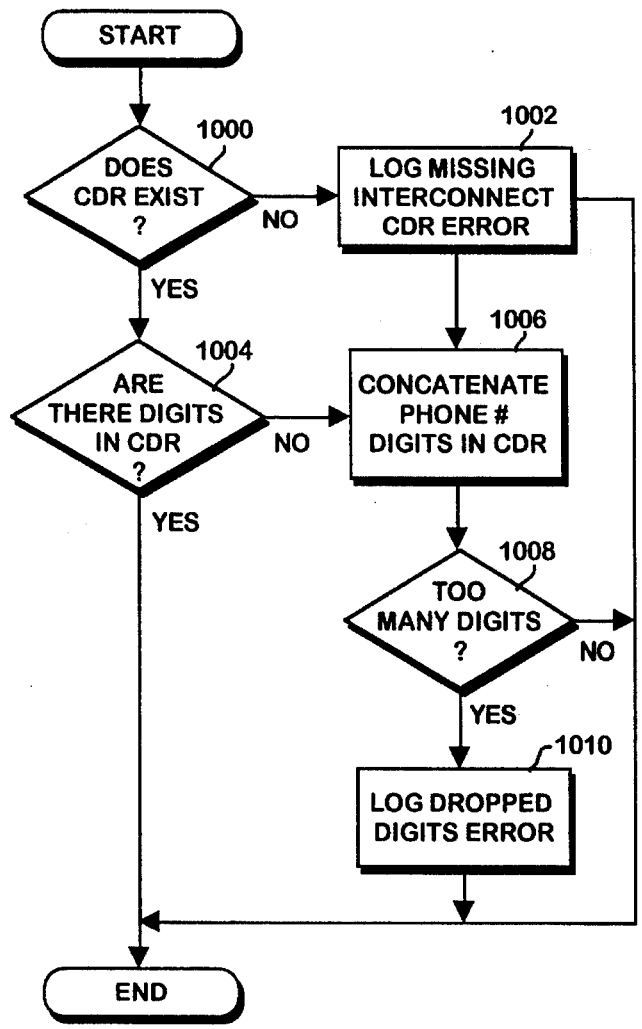

A subroutine for updating CDR with outbound telephone number is described now in conjunction with FIG. 10. A decision is made in block 1000 to determine if a CDR exists for the received RAR. If not, a missing interconnect (i.e. telephone network interconnect) CDR error is logged in block 1002. If a CDR does exist, a decision is made in block 1004 to determine if the telephone digits are present in that CDR. If not, the telephone number digits are concatenated in the CDR in block 1006. A decision is made in block 1008 to determine if the telephone number contains too many digits. If it does, a digits error message is logged in disk memory in block 1010.

Figure 11:
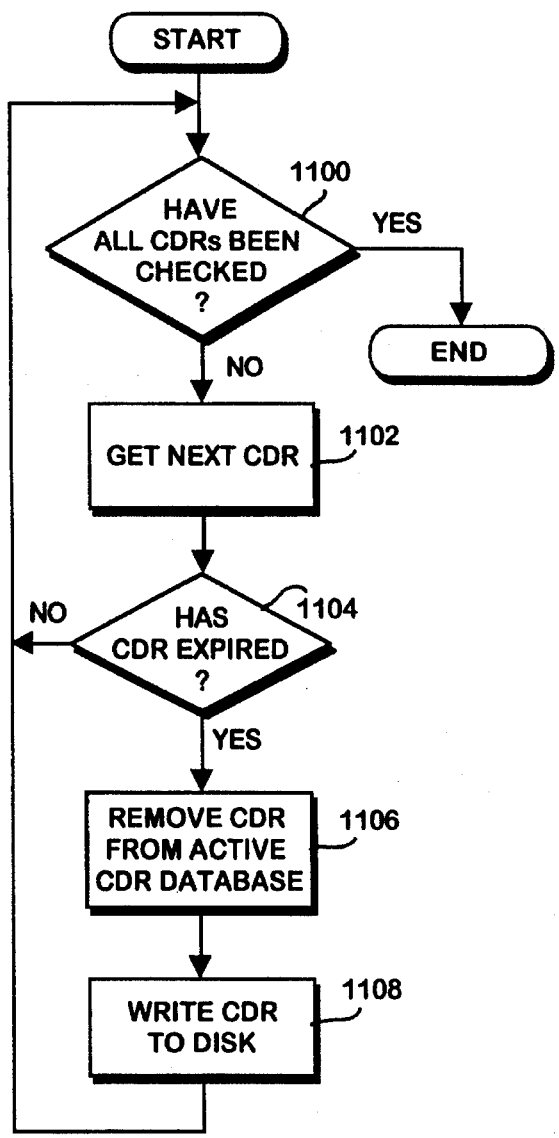

A subroutine for checking the active CDR database for expired CDRs performed in block 622 is described in conjunction with FIG. 11. Decision block 1100 determines if all CDRs in the active CDR database have been checked for expiration. If they have, processing in this subroutine is terminated. If not, the next CDR is retrieved from the active CDR database in block 1102, and a decision is made if that CDR has expired in decision block 1104. If it has expired, the CDR is removed from the active CDR database in block 1106 and written onto the disk storage 410, 412 in block 1108.

Figure 12:
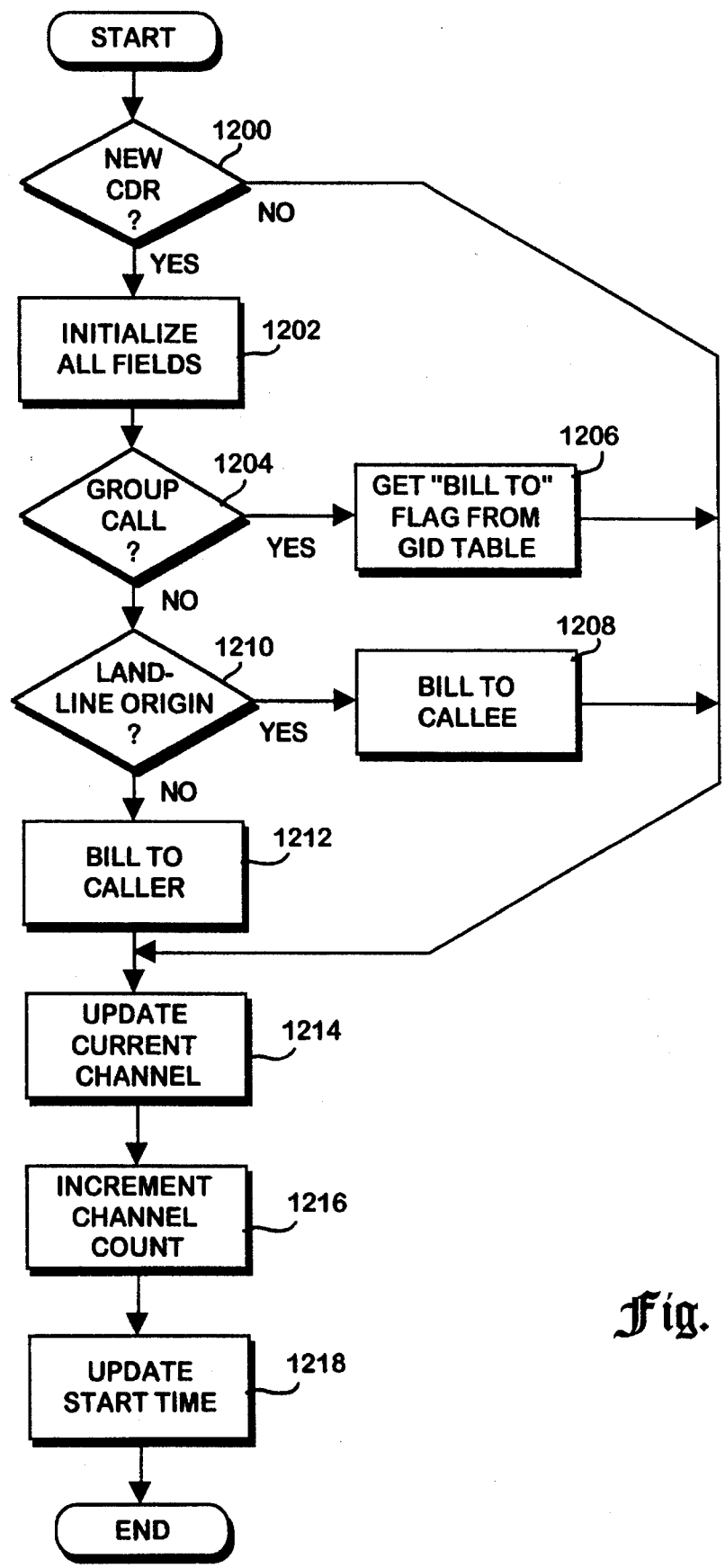

A subroutine which describes the process for updating a CDR with a channel assignment data performed in block 716 is described now in conjunction with FIG. 12. A decision is made in block 1200 if a new CDR is to be generated. If so, all record data fields (described in more detail below) in the CDR are initialized in block 1202, and a decision is made in block 1204 to determine if the present call is a group call. If so, a flag identified as "bill to" is retrieved from the GID table in block 1206. The "bill to" flag indicates whether the group or the caller is to be billed for the call. If it is not a group call, a decision is made in block 1208 to determine whether the call is of land-line origin. If so, a field in the CDR is marked so that a bill will be later generated to the callee in block 1210. If the present channel assignment is not of land-line origin, control proceeds to block 1212 in which the CDR is identified with the caller's LID so that the caller can be billed for the call. The channel assigned for the call communication is updated in block 1214, and the channel count for counting the number of channel assignments made during a call is incremented in block 1216. A start time of the present communication is updated and stored in the CDR in block 1218.

Thus, for every communication which occurs in the multi-site trunked communication system, a CDR is generated to record specific information about that call. As is evident from the above process flow description, the BCU 227 uses essentially only 5 types of multi-site messages obtained from the CAM 207 to generate the CDRs including: (1) channel slot assignment messages transmitted from the primary MIM when a channel has been assigned or dropped; (2) a secondary acknowledgment message from each secondary MIM to indicate that a receive channel has been assigned, (no message is issued when the receive channel is dropped because it is assumed that receive channel drop occurs at approximately the same time as transmit channel drop); (3) a channel primitive message is transmitted from each MIM involved in a console originated call to indicate to the originating console that a receive channel has been assigned or dropped; (4) a phone digits message is transmitted from the primary MIM during a radio-to-land-line call and contains the phone digit sequence of the land-line telephone involved in the call; and (5) a system time message is transmitted to all multi-site coordinator from a master timer once every 60 seconds in order to allow various devices to synchronize to the current system time.

The table below shows the data fields included in a CDR. A CDR is a series of ASCII characters terminated by a new line (NL) character. The records are variable length, but contain a fixed length segment which is always present, followed by zero or more suffix segments. For example, two types of suffix segments are currently defined. The first is an additional site segment, which identifies the sites and channels used in a multi-site call. The second type of suffix is a PSTN phone number field, which is appended to a mobile originated interconnect call record and contains the digits dialed by the caller.

| | 1. RECORD TYPE | | 2a. NODE ID SYSTEM | | 2b. NUMBER NODE | | 3. RECORD ID NUMBER | | | 4a. START DATE YEAR | | | | 4b. MONTH | | 4c. DAY | | 5a. START TIME HOUR | | 5b. MINUTE | | 5c. SECOND | |
|---|---|---|---|---|---|---|---|---|---|---|---|---|---|---|---|---|---|---|---|---|---|---|---|
| Byte | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| 6. CALL TYPE | | 7. CALLER ID NUMBER | | | | | | | | | | 8. CALLEE ID NUMBER | | | | | | | | | | 9. ELAPSED TIME... | |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |

| 9. (cnt) ...ELAPSED TIME | | 10. CUMULATIVE AIRTIME | | | | | 11. NUMBER OF CHANNEL ASSIGNMENTS | | | | | 12. NO. OF SITES | | 13a. SITE OF ORGIN NUMBER | | 13b. CHANNEL MAP | | | | | |
|---|---|---|---|---|---|---|---|---|---|---|---|---|---|---|---|---|---|---|---|---|---|
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | end of fixed length part of record —>

| 14a. ADDITIONAL SITE 1 NUMBER | | 14b. CHANNEL MAP | | | | | | | n+13a. ADDITIONAL SITE n (n <= 31) NUMBER | | n+13b. CHANNEL MAP | | | | | | NL |
|---|---|---|---|---|---|---|---|---|---|---|---|---|---|---|---|---|---|
| 71 | 72 | 73 | 74 | 75 | 76 | 77 | 78 | ... | x | x+1 | x+2 | x+3 | x+4 | x+5 | x+6 | x+7 | x+8 | x = 63 + (n * 8)

If the value of field 1 (RECORD TYPE) is 01 (mobile-to-land interconnect, an additional field is added to the end of the record. This segment contains the PSTN phone number which was dialed (up to 32 digits).

| 14. PSTN PHONE NUMBER | | | | | | | | | | | | | | NL |
|---|---|---|---|---|---|---|---|---|---|---|---|---|---|---|
| 71 | 72 | 73 | 74 | 75 | 76 | 77 | 78 | 79 | 80 | 81 | ... | 101 | 102 | 103 |

The following table defines each CDR data field.

| No. | Name | Size | Format | Range/Values | Description |
|---|---|---|---|---|---|
| 1. | Record Type | 2 | Hex | 00–FF | Defines the type of record. 00 = Mobile-to-Mobile, 01 = Mobile-to-Land Interconnect, 02 = Illegal 03 = Land-to-Mobile Interconnect, 04 = FF reserved |
| 2. | Node ID Number | 4 | Hex | 0000–FFFF | Unique identification number for the node. The 1st 2 digits are a system ID, the 2nd 2 digits identify the node within the system. |
| a. | System | | | | |
| b. | Node | | | | |
| 3. | Record ID Number | 4 | Radix64 | 0000–oooo | Unique identification number for the CDR. |
| 4. | Start Date | 8 | Decimal | | The date when the call started. |
| a. | Year | | | 1991–9999 | |
| b. | Month | | | 01–12 | |
| c. | Day | | | 01–31 | |
| 5. | Start Time | 6 | Decimal | | The time of day when the call started. Hours are given in military format. |
| a. | Hour | | | 00–23 | |
| b. | Minute | | | 00–99 | |
| c. | Second | | | 00–99 | |
| 6. | Call Type | 2 | Hex | 00–FF | The type of call. Specific values to be defined. Specifies whether call is group or individual, whether to bill the caller or callee, etc. |
| 7. | Caller ID Number | 10 | Decimal | 0000000000–9999999999 | For record types 00 and 01, this field contains the logical ID of the caller. For record type 03, the field contains the Interconnect Line ID. |
| 8. | Callee ID Number | 10 | Decimal | 0000000000–9999999999 (PID) 0000000000–0000002047 (GID) | For record types 00 and 03, contains the logical ID of the individual callee or the group ID of a called group. The type of ID is determined by the value of the call type field. For record type 01 contains the Interconnect Line ID. |
| 9. | Elapsed Time | 4 | Hex | 0000–FFFF | The duration of the call in seconds. |
| 10. | Cumulative Airtime | 5 | Hex | 00000–FFFFF | The number of seconds of actual airtime used on all sites on the local node for this call. (Does not include airtime on site 32 which is a remote node.) |
| 11. | Number of Channel Assignments | 5 | Hex | 00000–FFFFF | The number of separate times a channel was assigned on a site within the local node for this call. |
| 12. | Number of Sites | 2 | Decimal | 01–32 | The number of sites within the local node which participated in this call. |
| 13. | Site of Origin | 8 | | | Two part field. The 1st 2 characters contain the site number where the call originated. If this no. is 32, the actual originating site is not on the local node. The last 6 characters contain a hex. bitmap. Each bit corresponds to a channel on the specified site. (LSB = channel 1, MSB = channel 24 Each bit set indicates at least one channel assignment on the corresponding channel. |
| a. | Number | | Decimal | 01–32 | |
| b. | Channel Map | | Hex | 000000–FFFFFF | |
| 14. | Additional Site 1 | 8 | | | Identical to field 13. Contains site number and channel map for the 1st additional site in a multi-site call. There will be n additional site fields, where n = Number of Sites (field 12) − 1. If site 32 is shown as an additional site, it indicates a multinode call originated on the local node. |
| a. | Number | | Decimal | 01–32 | |
| b. | Channel Map | | Hex | 000000–FFFFFF | |
| 14. | PSTH Phone Number | 32 | Alpha-Numeric | | Used in record type 01 only. Contains up to 32 digits of the phone number dialed by the caller. The phone number is left justified and padded with blanks on the right. |
| n-14 | Origin Node 10 | 4 | Hex | 0000–FFFF | Format identical to field 2. This field is added to the CDR only if the value of field 13a. is 32. This field and the following field are used to identify the CDR containing call data from the node node of origin. |
| a. | System | | | | |
| b. | Node | | | | |
| n-15 | Origin Record ID Number | 4 | Radix64 | 0000–cooo | Format identical to field 3. see description of field n-14. |

Once CDRs have been generated in the appropriate database format as indicated above and stored in disk memory 410, 412, conventional billing software may be adapted to generate and print detailed bills for usage of the rf trunked communication system based on the CDR information.

Figure 13:
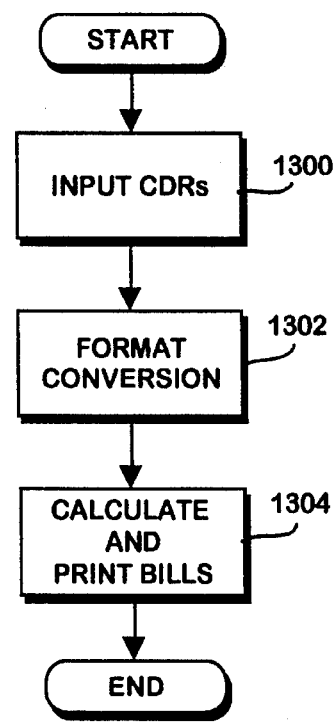
FIG. 13 is a flow chart illustrating how output records from the billing correlation unit may be processed using conventional billing software.

As described earlier, billing for trunked systems is more complicated than in cellular systems where there is only one call type, one channel per call, one caller and one callee, and each call is rated simply by time of day usage. Trunked communications billing is significantly more complicated and requires in addition to different time of day rates (peak/off peak) and discount structures, additional surcharges for special trunked radio communication features such as "emergency", roaming, multi-node, group calls, and call types. Referring to FIG. 13, CDRs are input (block 1300) and converted from their present format into a format acceptable to conventional billing software packages (block 1302). Conventional bill calculation and printing procedures (block 1304) are modified to include the call type indicated in the CDR, e.g., clear voice, encrypted communications, data, and interconnect to the PSTN.

An example of a bill generated according to the present invention as described above is set forth below for account number 8 corresponding to mobile unit 00101-01002.

DATE: DEC 4, 1991
ACCOUNT NO: 00000008
DETAIL OF SERVICE AND EQUIPMENT/UNIT 00101-01002

| | | | |
|---|---|---|---:|
| 1. | MONTHLY ACCESS-CLEAR VOICE #2 | OCT 02 THRU NOV 30 | 37.00 |
| 2. | MONTHLY ACCESS-CLEAR VOICE #2 | DEC 01 THRU DEC 31 | 18.50 |
| 3. | MONTHLY ACCESS-VOICE GUARD #2 | OCT 02 THRU NOV 30 | 45.00 |
| 4. | MONTHLY ACCESS-VOICE GUARD #2 | DEC 01 THRU DEC 31 | 22.50 |
| 5. | MONTHLY ACCESS-DATA #2 | OCT 02 THRU NOV 30 | 70.00 |
| 6. | MONTHLY ACCESS-DATA #2 | DEC 01 THRU DEC 31 | 35.00 |
| 7. | DETAILED BILLING | OCT 02 THRU NOV 30 | 5.00 |
| 8. | DETAILED BILLING | DEC 01 THRU DEC 31 | 2.50 |
| | TOTAL SERVICE AND EQUIPMENT | | 235.50 |

DETAIL OF USAGE, CHARGES AND CREDITS/UNIT 00101-01002

| | | |
|---|---|---:|
| 1. | EMERGENCY SURCHG 3 CALLS | 3.00 |
| 2. | ROAMING SURCHG 3 CALLS | 6.00 |
| 3. | MULT-NODE SURCHG 4 CALLS | 16.00 |
| 4. | GROUP SURCHG 3 CALLS | 0.00 |
| 5. | ACTIVATION FEE - CLR VOICE #2 | 20.00 |
| 6. | ACTIVATION FEE - VCE GUARD #2 | 30.00 |
| 7. | ACTIVATION FEE - DATA #2 | 40.00 |
| 8. | AIR CLR VCE-2 PK 3.0 MIN | 0.75 |
| 9. | AIR CLR VCE-2 OP 2.8 MIN | 0.50 |
| 10. | AIR VCE GRD-2 PK 2.0 MIN | 0.70 |
| 11. | AIR VCE GRD-2 OP 1.4 MIN | 0.00 |
| 12. | AIR DATA-2 PK 9.6 MIN | 5.76 |
| 13. | AIR DATA-2 OP 3.1 MIN | 0.00 |
| | TOTAL USAGE, CHARGES AND CREDITS | 122.71 |

DETAIL OF USAGE/UNIT 00101-01002

@ - ROAMING    ! - EMERGENCY    # - MULTINODE
* - GROUP    % - VOICE GUARD/INTERCONNECT

| ITEM | DATE | TIME OF CALL | NUMBER CALLED | NUMBER OF SITES | TYPE OF CALL | BILLABLE TIME | RATE | AIR-TIME COST | TOTAL COST OF CALL |
|---|---|---|---|---|---|---|---|---|---|
| **** CLEAR VOICE **** | | | | | | | | | |
| 1. | 1107 | 1038 | 0000000102 | 01 | P!* | 1.0 | .25 | 0.25 | 0.25 |
| | 1107 | 1038 | 0000000102 | 02 | P!*# | 2.0 | .25 | 0.50 | 0.50 |
| 2. | 1112 | 0524 | 0000002006 | 01 | O@# | 1.4 | .18 | 0.2520 | 0.2520 |
| | 1112 | 0524 | 0000002006 | 01 | O | 1.4 | .18 | 0.2520 | 0.2520 |
| | | CLEAR VOICE TOTALS | | | | 5.8 | | 1.2540 | |
| **** VOICE GUARD **** | | | | | | | | | |
| 1. | 1111 | 1636 | 0000002008 | 01 | P | 1.0 | .35 | 0.35 | 0.35 |
| | 1111 | 1636 | 0000002008 | 01 | P# | 1.0 | .35 | 0.35 | 0.35 |
| 2. | 1113 | 2019 | 0000000102 | 03 | O!* | 1.4 | .00 | 0.00 | FREE |
| | | VOICE GUARD TOTALS | | | | 3.4 | | 0.70 | |
| 1. | 1116 | 1558 | 0000001002 | 01 | O@ | 3.1 | .00 | 0.00 | FREE |
| 2. | 1121 | 1716 | 0000001002 | 01 | P@# | 4.8 | .60 | 2.88 | 2.88 |
| | 1121 | 1716 | 0000001002 | 01 | P | 4.8 | .60 | 2.88 | 2.88 |
| | | DATA TOTALS | | | | 12.7 | | 5.76 | |
| | TOTAL CURRENT CHARGES FOR 00101-01002 | | | 358.21 | | | | | |

The example bill shows for each mobile unit a monthly charge as well as detailed charges for specific services used by each unit including various surcharges, activation fees, and call types. The detailed description of usage per mobile unit includes line item, date, time of call, number called, number of sites involved in the call, the type of call, the billable time, the rate at which that time is charged, the air time cost, and the total cost of each call.

Thus, the present invention correlates individual calls to specific users and groups in trunked rf communication system. Wide area multi-site correlation of rf usage is obtained for an infinite number of users and/or groups. Both specific groups and specific callers within a group can be individually billed. Moreover, the present invention adapts the CDRs so they may be read and processed by existing full featured third party billing companies to produce corresponding detailed bills.

While the invention has been described in connection with what is presently considered to be the most practical and preferred embodiments, it is to be understood is not to be limited to the disclosed embodiment. On the contrary, the invention is intended to cover various modifications and equivalent arrangements included within the spirit and scope of the appended claims.

What is claimed is:

1. A method for correlating rf communications in a multi-site, transmission trunked rf communications system including a plurality of sites controlling radio unit rf communications in corresponding geographical site areas and at least one multisite coordinator for monitoring messages from each site and establishing and removing rf communication channels, comprising:

obtaining information from the multi-site coordinator including corresponding plural channel assignments and channel drops occurring during each conversation involving a radio unit, and correlating rf communication based on the channel assignments and channel drops obtained for each radio unit.

2. The method according to claim 1 further comprising:

generating bills detailing for each radio unit specific instances and types of rf communication resources used based on the correlating step.

3. The method according to claim 2, wherein the specific instances of rf communication resources includes for each communication the date and time, the number of site areas involved, the duration, the rate of service for the particular air-time used, and the total cost.

4. The method according to claim 2, wherein the specific types of rf communication resources includes for each communication whether the communication was a voice or data communication, an encrypted or unencrypted communication, and an individual or group communication.

5. The method according to claim 1 wherein the correlating step includes:

generating individual call detail records for each conversation based on the channel assignments and channel drops, each call detail record defining whether the call involves radio unit to radio unit communications or radio unit and land-line communications, a call starting date and time of day, the call type caller and callee identification, elapsed time, cumulative airtime, number of sites and landline telephone number.

6. The method according to claim 1 wherein a dispatch console, connected to the multi-site coordinator, participates in conversations with radio units in plural site areas and the obtaining step further includes:

obtaining information indicating channel assignments and channel drops for a console originated conversation.

7. The method according to claim 1 wherein the obtaining step further includes:

obtaining telephone digit sequence information for radio unit conversations involving land-line communications.

8. The method according to claim 1, further comprising:

generating call detail records for each conversation based on the correlating step, and generating bills detailing for each radio unit specific instances and types of rf communication resources used based on the correlating step.

9. A method according to claim 1 wherein the correlating step further includes:

determining air time used for each conversation.

10. A method according to claim 1 wherein before the correlating step the method further includes:

processing each channel assignment and channel drop associated with each conversation to generate a call detail record for each conversation, and storing the call detail record.

11. A method according to claim 1 wherein before the correlating step the method further includes:

determining whether the channel assignment and channel drop information for each conversation included an interconnection with a land-line telephone network, and associating the telephone number of the interconnection with a call detail record generated to record a corresponding conversation.

12. A method according to claim 1 wherein before the correlating step, the method further includes:

determining whether each conversation is an unencrypted voice, data, or encrypted type of conversation, and associating the determined type of conversation with a call detail record generated for that conversation.

13. A method according to claim 1 wherein before the correlating step the method further includes:

determining whether the conversation involves only individual radio units or a group of radio units, generating identification numbers for each individual radio unit and group involved in the conversation, wherein the correlating step includes correlating the use of rf communication resources with the individual and group identification numbers.

14. A method for correlating rf communications in a multi-site, trunked rf communications system including a plurality of sites controlling individual radio unit rf communications and group radio unit rf communications involving multiple radio units for corresponding site areas and at least one multi-site coordinator for monitoring messages from each site and establishing and removing rf communication channels, comprising:

obtaining information from the multi-site coordinator including corresponding plural channel assignments and channel drops generated during each communication originating from or received by each radio unit, and correlating rf communication resources used by each radio unit based on the plural channel assignments and channel drops obtained for each radio unit and for each group of radio units involved in each communication.

15. The method according to claim 14 further comprising:

generating bills detailing, for each radio unit and each group of radio units involved in a communication, specific instances and types of rf communication resources used based on the correlating step.

16. A system for monitoring trunked rf communication, comprising:

plural rf sites for controlling transmission trunked rf communications from and to radio units within geographic site areas corresponding to the sites;

a multi-site coordinator, coordinator, connected to the plural rf sites, for monitoring control messages from each site regarding plural channel assignments and channel drops that occur during the course of each call and establishing and removing rf communication channels for each call involving radio units in plural site areas; and a correlation unit, connected to the multisite coordinator, for correlating rf communication resources used for individual calls originating from or received by each radio unit based on channel assignments and channel drop information for each call.

17. The system according to claim 16, wherein the correlation unit generates a call detail record for each call which indicates the rf communication resources used for each call.

18. The system according to claim 17, wherein each call detail record is generated based on the channel assignment and channel drop information for an associated call communication.

19. The system according to claim 16, wherein the multi-site coordinator includes:

- a plurality of microprocessor-controlled nodes each corresponding to and coupled with the plurality of sites through a data link and trunked audio link;
- an audio bus, connected to each node, for conveying a plurality trunked communications between the sites;
- a message bus, connected to each node, for conveying channel assignment and channel drop messages from each node.

20. The system according to claim 19, wherein the multi-site coordinator includes:

- a central activity node for monitoring messages on the message bus and collecting as data records those messages relating to rf channel usage.

21. The system according to claim 20, wherein the correlation unit receives the data records from the central activity node over a high speed data link and converts the raw data records into individual call detail records for each call.

22. The system according to claim 20, wherein the data records include channel slot assignment and drop messages generated by a primary node corresponding to a call originated by a caller radio unit from a primary site controller and channel assignment messages generated by a secondary node corresponding to a secondary site controller for a called radio unit when a receive channel has been assigned by the secondary site controller.

23. The system according to claim 22, further comprising:

- a dispatch console,
- a console interface node, connected to the audio and message networks, for coupling calls originated from the dispatch console to one or a group of radio units, wherein the central activity node monitors channel assignments and drops involving the dispatch console.

24. The system according to claim 16, further comprising:

means for calculating and printing bills for each radio unit;

means for converting call detail records into a format acceptable by the means for calculating, wherein each bill details specific items relating to rf usage by each radio unit.

25. The system according to claim 24, wherein each bill includes the date, time, type, duration, number of sites and total cost of each call in which the radio unit was involved.

26. The system according to claim 17, wherein each call detail record includes for each call at least one of the following: whether the call involves radio unit to radio unit communications or radio unit and landline communications, a call starting date and time of day, whether the call is individual or group, caller and callee identification, elapsed time, cumulative airtime, number of channel assignments, number of sites, and landline telephone number.

* * * * *